United States Patent
Liu et al.

(10) Patent No.: US 10,063,467 B2
(45) Date of Patent: Aug. 28, 2018

(54) VIRTUAL EXTENSIBLE LOCAL AREA NETWORK PERFORMANCE ROUTING

(71) Applicant: Cisco Technology, Inc., San Jose, CA (US)

(72) Inventors: Jun Liu, Shanghai (CN); Zhiyong Fang, Chongqing (CN); Bin Shi, Shanghai (CN); Feng Cai, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 323 days.

(21) Appl. No.: 14/714,611

(22) Filed: May 18, 2015

(65) Prior Publication Data
US 2016/0344622 A1   Nov. 24, 2016

(51) Int. Cl.
*H04L 12/721* (2013.01)
*H04L 12/46* (2006.01)
*H04L 12/715* (2013.01)

(52) U.S. Cl.
CPC .......... *H04L 45/38* (2013.01); *H04L 12/4633* (2013.01); *H04L 45/64* (2013.01)

(58) Field of Classification Search
CPC ..... H04L 45/38; H04L 12/4633; H04L 49/70; C07K 14/005; C12N 2740/16122; C12N 7/00; G01N 2333/16; G01N 2333/162; G01N 2469/20; G01N 33/56988
USPC ....................................................... 370/392
See application file for complete search history.

(56) References Cited

U.S. PATENT DOCUMENTS

| | | | |
|---|---|---|---|
| 8,948,054 B2 | 2/2015 | Kreeger et al. | |
| 2008/0219205 A1* | 9/2008 | Kang | H04L 45/025 370/315 |
| 2010/0054241 A1* | 3/2010 | Shah | H04L 45/00 370/389 |
| 2014/0016501 A1* | 1/2014 | Kamath | H04L 69/22 370/253 |
| 2014/0348166 A1 | 11/2014 | Yang et al. | |
| 2014/0355450 A1 | 12/2014 | Bhikkaji et al. | |
| 2015/0016300 A1 | 1/2015 | Devireddy et al. | |
| 2015/0124827 A1* | 5/2015 | Rangaraman | H04L 12/4666 370/392 |
| 2015/0180769 A1* | 6/2015 | Wang | H04L 45/38 370/236 |
| 2016/0099853 A1* | 4/2016 | Nedeltchev | H04L 43/0888 370/253 |
| 2016/0173329 A1* | 6/2016 | Latham | H04L 41/0806 370/254 |

* cited by examiner

*Primary Examiner* — Mark H Rinehart
*Assistant Examiner* — Kokou R Detse
(74) *Attorney, Agent, or Firm* — Edell, Shapiro & Finnan, LLC (57) ABSTRACT

A tunnel endpoint of a virtual network monitors the flows between the tunnel endpoint and at least one other tunnel endpoint. The virtual network spans a physical network. A flow identifier for each flow is determined based on packet headers of packets in each respective flow. A path identifier for each flow is also determined based on the packet headers of the packets in each respective flow. Each path identifier indicates a route that the respective flow takes in the physical network to reach the respective destination tunnel endpoint. The path identifier and the flow identifier of the respective flows are then transmitted to a controller of the virtual network.

20 Claims, 6 Drawing Sheets

VIRTUAL EXTENSIBLE LOCAL AREA NETWORK PERFORMANCE ROUTING

TECHNICAL FIELD

The present disclosure relates to routing data packets through virtual computer networks.

BACKGROUND

The Virtual Extensible Local Area Network (VXLAN) protocol provides a means to extend a Layer 2 network overlay scheme over a Layer 3 network to alleviate issues in data center infrastructure, such as Media Access Control (MAC) address scaling, virtual local area network (VLAN) scaling, and multi-tenancy. Traffic transferred between different virtual tunnel endpoints (VTEPs) are encapsulated in a VXLAN User Datagram Protocol (UDP) tunnel.

DESCRIPTION OF EXAMPLE EMBODIMENTS

Overview

A method is provided for enabling monitored flows in a virtual network to be re-routed. A first tunnel endpoint of the virtual network monitors at least one flow between the first tunnel endpoint and at least one second tunnel endpoint. The virtual network spans a physical network. A flow identifier of the at least one flow is determined based on packet headers of packets in each respective flow. A path identifier of the at least one flow is also determined based on the packet headers of the packets in each respective flow. Each path identifier indicates a route that the respective flow takes in the physical network to reach a respective second tunnel endpoint. The path identifier and the flow identifier of the respective flows are then transmitted to a controller.

Detailed Description

Virtual networks provide secure connections across an otherwise insecure network by sending network traffic through virtual tunnels overlaid on the insecure network. The virtual tunnels provide security to the network traffic, preventing inspection and performance optimization of the traffic. The techniques presented herein provide for identification of data packets in particular flows through virtual tunnels in order to route the data packets through a path that is optimized for the current network conditions.

Figure 1:
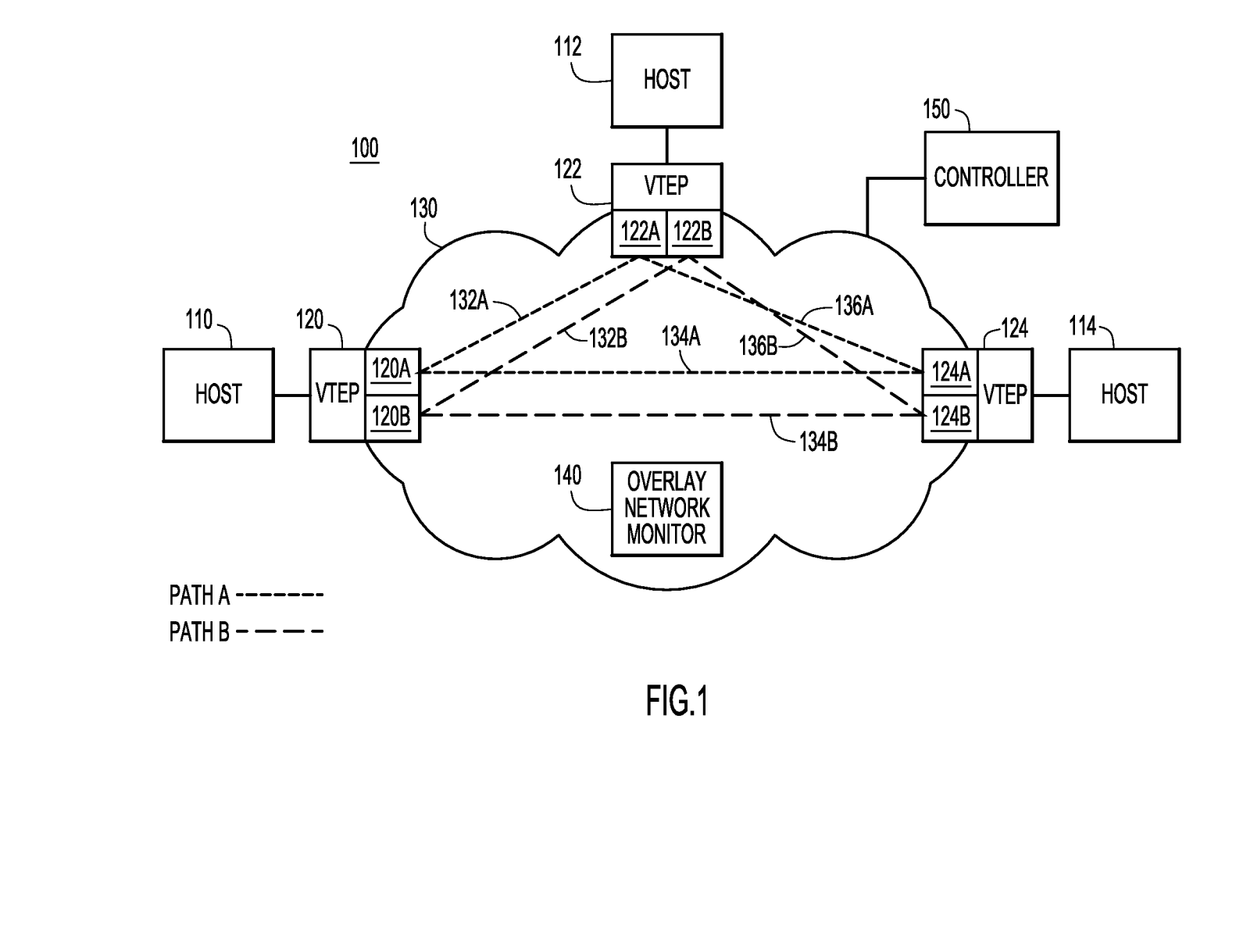
FIG. 1 is a block diagram showing components of a VXLAN-enabled network configured for performance routing of traffic in encrypted tunnels according to an example embodiment.

Referring to FIG. 1, a simplified block diagram of secure cloud network performance system 100 is shown. Endpoint devices 110, 112, and 114 communicate with each other through a virtual extensible local area network (VXLAN)-enabled network. Each endpoint devices 110, 112, and 114 are connected to the VXLAN-enabled network through virtual tunnel endpoints (VTEPs) 120, 122, and 124, respectively.

Various network elements (not shown in FIG. 1) carry the signals between the VTEPs 120, 122, and 124 along different paths. Between any two VTEPs chosen from VTEPs 120, 122, and 124, there are two paths (A and B) through the network 130. The two paths use separate network interfaces, and may traverse different network elements in network 130.

The paths between VTEPs 120 and 122 are shown as paths 132A and 132B. Path 132A connects network interface 120A of VTEP 120 with network interface 122A of VTEP 122. Path 132B connects network interface 120B of VTEP 120 with network interface 122B of VTEP 122. Similarly, path 134A connects network interface 120A of VTEP 120 with network interface 124A of VTEP 124. Path 134B connects network interface 120B of VTEP 120 with network interface 124B of VTEP 124. Additionally, path 136A connects network interface 126A of VTEP 126 with network interface 124A of VTEP 124. Path 136B connects network interface 126B of VTEP 126 with network interface 124B of VTEP 124.

In one example, an overlay network monitor 140 is included in the network 130 to monitor the performance of various aspects of the network 130. The monitor 140 may determine if a particular path is congested by, for example, detecting packet drops/latency on traffic flows on a particular path. The monitor 140 may report to a controller 150, and the controller 150 would make a decision on path selection for particular data flows.

Figure 2:
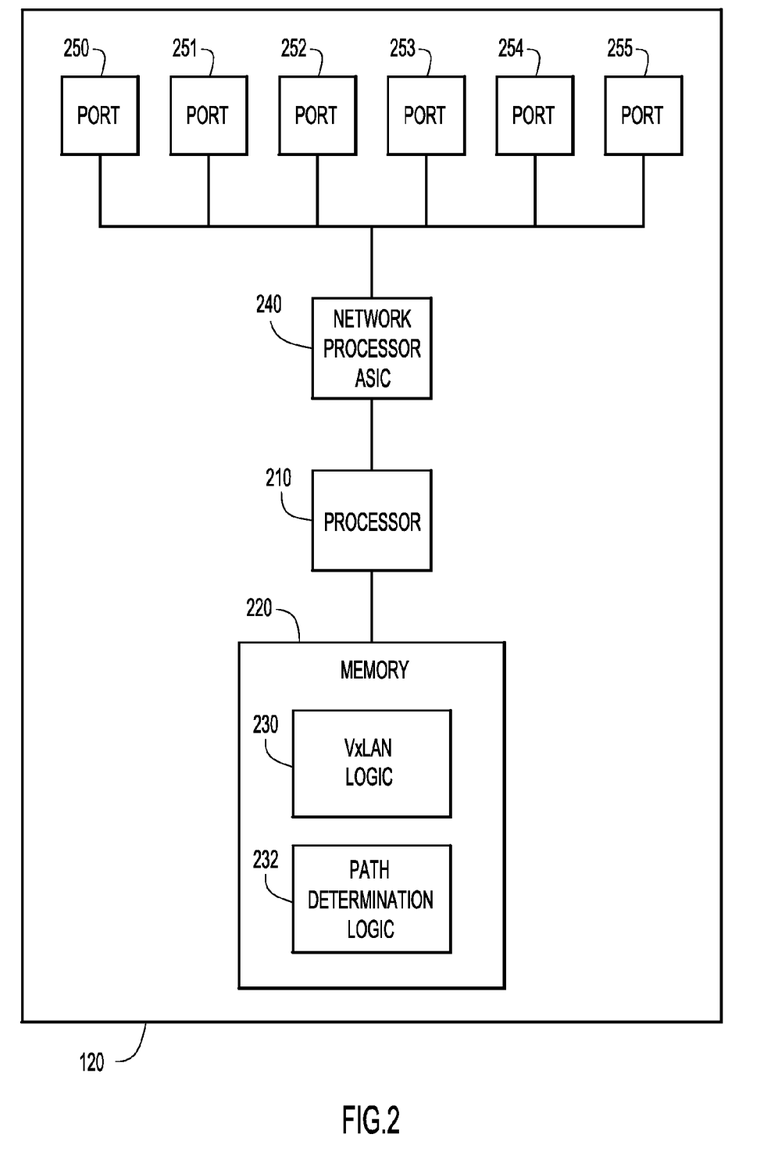
FIG. 2 is a simplified block diagram of a network device used to coordinate communications through the tunnels of a VXLAN-enabled network according to an example embodiment.

Referring now to FIG. 2, a simplified block diagram is shown of a network device that serves as a VTEP. While FIG. 2 refers to a network device that supports only VTEP 120, it is to be understood that VTEPs 122 and 124 may be supported in a network device in a similar manner. A network device supporting VTEP 120 includes, among other possible components, a processor 210 to process instructions relevant to processing communication packets, and memory 220 to store a variety of data and software instructions (e.g., VXLAN logic 230, path determination logic 232, headers information of communication packets, etc.). The network device also includes a network processor application specific integrated circuit (ASIC) 240 to process (route, switch, drop, etc.) communication packets that flow through the network element 120. Network processor ASIC 240 processes communication packets to and from ports 250, 251, 252, 253, 254, and 255. While only six ports are shown in this example, any number of ports may be included in network element 120.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein.

The VXLAN encapsulation scheme uses a MAC-in-UDP encapsulation to extend Layer 2 segments across a data center network that uses a UDP-IP transport protocol. At the VTEP, a VXLAN header is added to the original Layer 2 frame and placed in a UDP-IP packet. The encapsulated packet tunnels the Layer 2 packet over the Layer 3 network.

Figure 3:
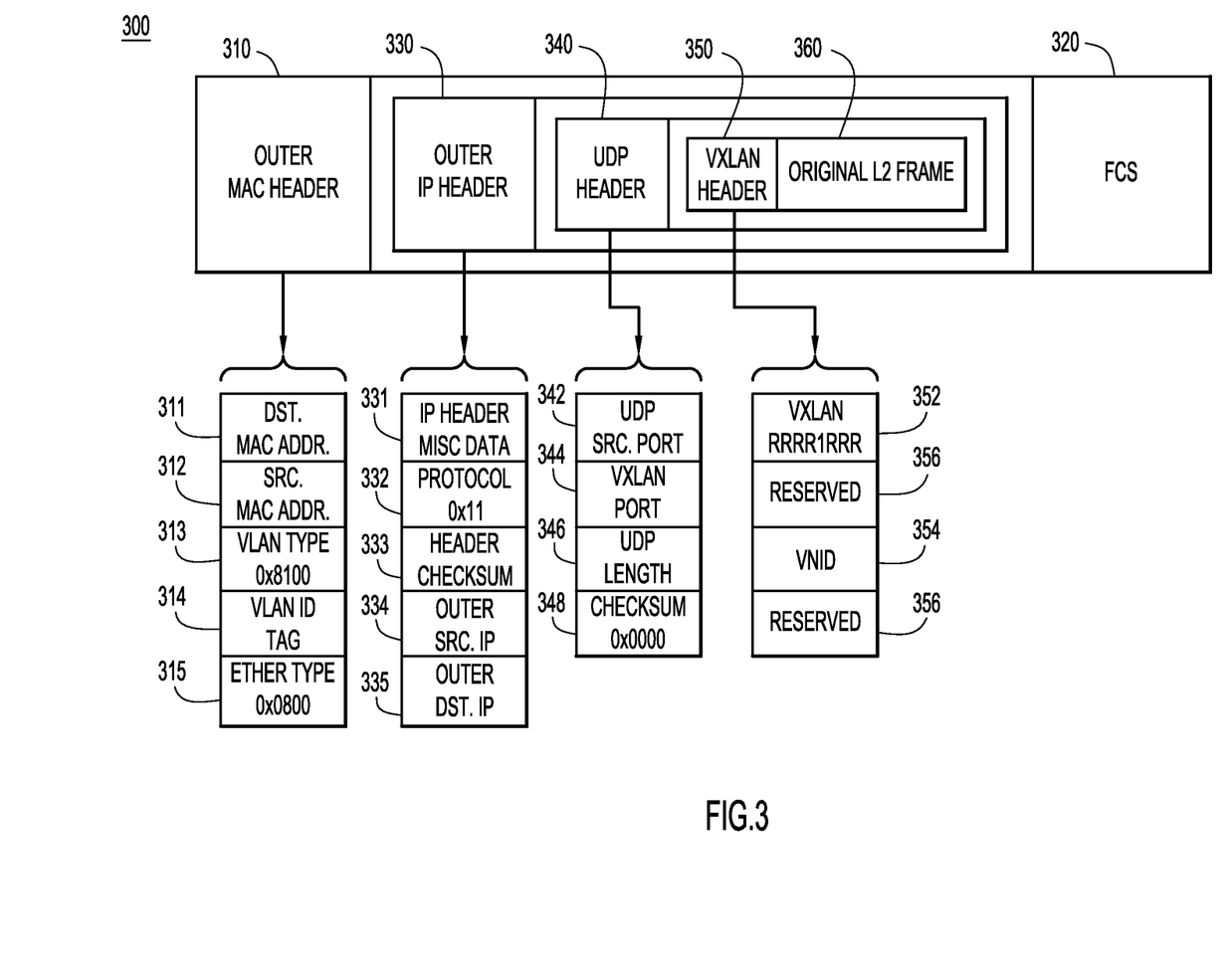
FIG. 3 is a block diagram showing the encapsulation headers in the VXLAN packet, according to an example embodiment.

Referring now to FIG. 3, an example of the encapsulation headers of a Layer 2 data frame in a VXLAN is shown. The encapsulated data packet 300 comprises an outer encapsulation of Media Access Control (MAC) header 310 and Frame Check Sequence (FCS) 320. The outer MAC header includes a destination MAC address 311, a source MAC address 312, an optional VLAN type field 313, a VLAN ID field 314, and an Ethernet type field 315. The FCS 320 is a cyclic redundancy check to detect corruption of the data packet.

Inside the payload of the Layer 2 frame defined by the MAC header 310 and the FCS 320, a Layer 3 packet starts with an Internet Protocol (IP) header 330 that includes a miscellaneous data field 331, a protocol field 332, a header checksum field 333, an outer source IP address 334, and an outer destination IUP address 335. In the payload of the Layer 3 packet, a layer 4 packet begins with a User Datagram Protocol (UDP) header 340 comprising the UDP source port 342, VXLAN Port 344, UDP length field 346, and checksum 348. In the payload of the layer 4 packet, the VXLAN header 350 precedes the original Layer 2 data frame 360. The VXLAN header 350 includes a VXLAN designation field 352, a virtual network identifier (VNID) field 354, and two reserved fields 356. The VNID field 354 is used to identify Layer 2 segments and isolate the segments in the virtual network.

In one example, the VNID field 354 can be used to indicate which path the outer Layer 2 frame takes in the network 130. Each VNID may correspond to a particular path between two VTEPs, with the VTEPs accounting for multiple VNIDs across a single virtual network. Alternatively, a separate identifier for the path may be included as part of the reserved fields 356.

Figure 4:
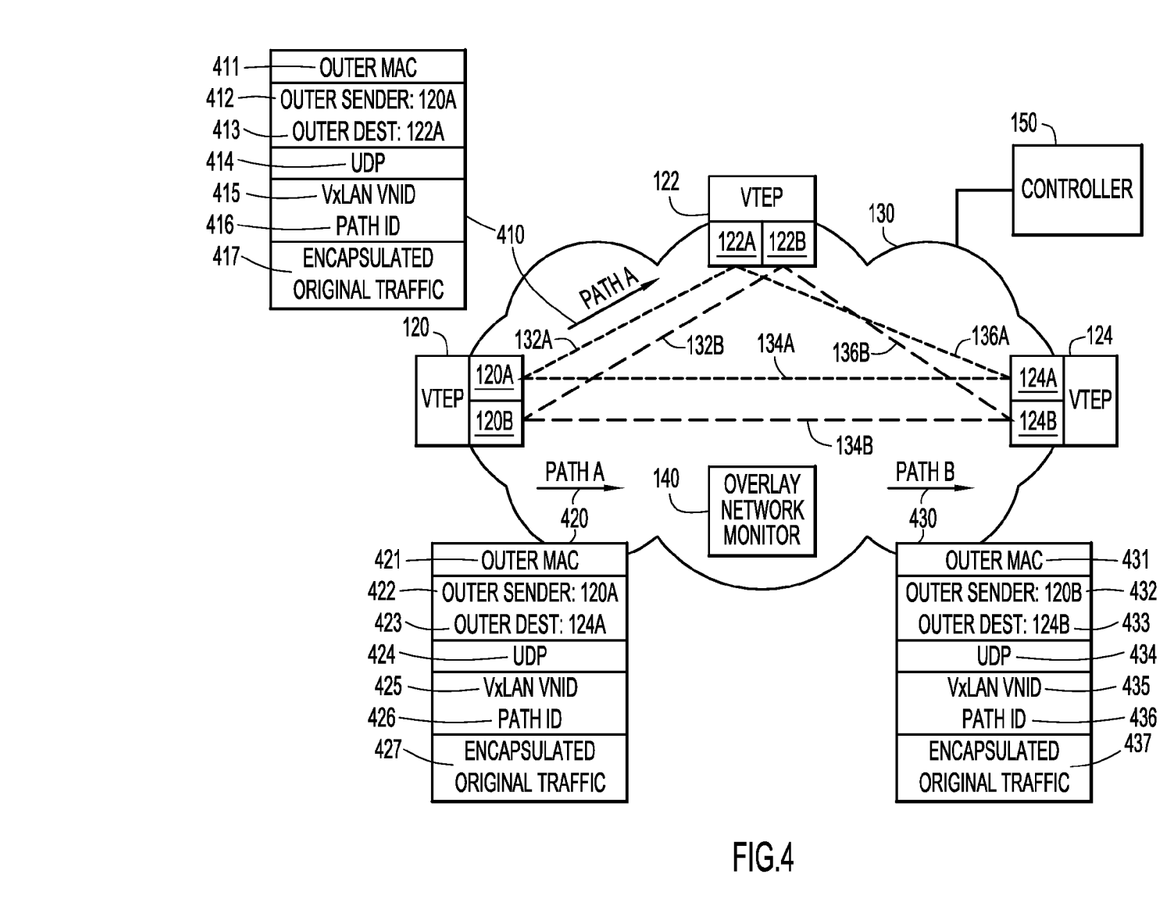
FIG. 4 is a simplified block diagram showing encapsulated data packets along different paths in the VXLAN-enabled network according to an example embodiment.

Referring now to FIG. 4, a simplified block diagram shows the communications between VTEPs in routing flows through different paths in the network 130. One flow of traffic from VTEP 120 to VTEP 122 along path A is shown with frame 410. Frame 410 travels through the network 130 from VTEP 120 to VTEP 122 using path 132A. Frame 410 includes the outer MAC header 411, the outer sender IP address 412, outer destination 413, UDP header 414, VXLAN VNID 415, a path identifier 416, and the original traffic frame 417. Since frame 410 is routed along path A, the outer sender IP address 412 corresponds to the IP address of network interface 120A, and the outer destination IP address 413 corresponds to the IP address of the network interface 122A. In one example, the path identifier 416 may be included in the VXLAN VNID 415. In another example, the path 132B may be designated as a backup to the active path 132A.

Frames 420 and 430 show encapsulated frames in traffic flows between VTEP 120 and VTEP 124 along paths A and B, respectively. Frame 420 includes the outer MAC header 421, the outer sender IP address 422, the outer destination IP address 423, the UDP header 424, the VXLAN VNID 425, the path identifier 426, and the original traffic frame 427. Since frame 420 is routed along path A, the outer sender IP address 422 corresponds to the IP address of network interface 120A, and the outer destination IP address 423 corresponds to the IP address of the network interface 124A. Similarly, frame 430 includes the outer MAC header 431, the outer sender IP address 432, the outer destination IP address 433, the UDP header 434, the VXLAN VNID 435, the path identifier 436, and the original traffic frame 437. Since frame 430 is routed along path B, the outer sender IP address 432 corresponds to the IP address of network interface 120B, and the outer destination IP address 433 corresponds to the IP address of the network interface 124B. In one example, flows using frames 420 and 430 may be used to load balance traffic between VTEP 120 and VTEP 124.

In one example, VTEP 120 may maintain a database of the flows that are going through it. The database may track the flows according to the application that generated the traffic, the VNID, the destination VTEP, and/or the path identifier, as shown in Table 1 below. VTEP 120 may also send the flow information to controller 150 for a final decision on which path each flow should be routed.

TABLE 1

Flow tracking through VTEP 120

| Flow | VNID | Remote VTEP | PATH-ID |
| --- | --- | --- | --- |
| Application 1 | 10 | VTEP 124 | A |
| Application 2 | 10 | VTEP 124 | B |
| Application 3 | 10 | VTEP 122 | A |
| Application 4 | 10 | VTEP 122 | B |

Figure 5:
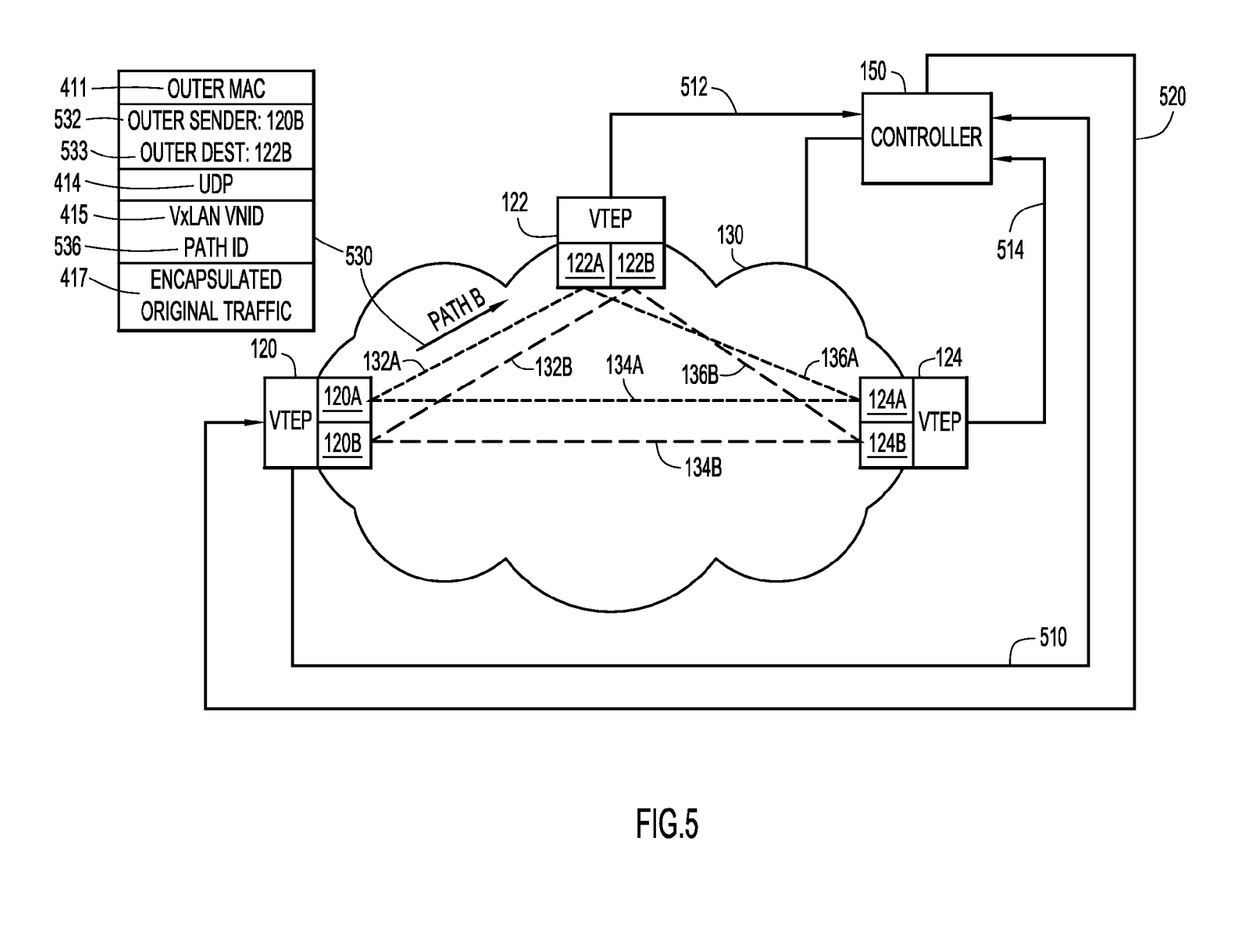
FIG. 5 is a simplified block diagram showing a controller switching a path taken by a data packet according to an example embodiment.

Referring now to FIG. 5, a simplified block diagram shows the communications with the controller leading to the controller switching a path through one of the VTEPs. VTEP 120 sends flow information 510 to the controller 150. Similarly, VTEPs 122*n* and 124 send flow information 512 and 514, respectively, to the controller 150. The controller 150 determines that one of the flows in VTEP 120 should be switched from path A to path B and sends a path enforcement notification 520 to the VTEP 120. The path enforcement notification 520 identifies the flow that is to be switched (e.g., by the application generating the original traffic 417) and the path to which the flow is to be switched (e.g., by a path identifier). After the controller 150 directs the VTEP 120 to change paths for an identified flow, the VTEP 120 encapsulates the traffic in the identified flow as encapsulated frame 530. Changes to the frame 530 from the original frame 410 (shown in FIG. 4) include changing the outer sender IP address 412 to the address 532 of the network interface 120B, changing the outer destination IP address 413 to the address 533 of the network interface 122B, and changing the path identifier 416 to the new path identifier 536.

As each VTEP reports flow information to the controller 150, the controller 150 may build up a database of flows that are in use in a particular VXLAN. The database of flows may include the VNID of the particular VXLAN, the destination VTEP of each flow, the path identifier to the destination VTEP, and the address for the destination VTEP, as shown in Table 2 below.

TABLE 2

Flow tracking in VXLAN VNID = 10

| VNID | Remote VTEP | PATH-ID | Network Interface |
| --- | --- | --- | --- |
| 10 | VTEP 120 | A | 120A |
| 10 | VTEP 120 | B | 120B |

TABLE 2-continued

Flow tracking in VXLAN VNID = 10

| VNID | Remote VTEP | PATH-ID | Network Interface |
|------|-------------|---------|-------------------|
| 10 | VTEP 122 | A | 122A |
| 10 | VTEP 122 | B | 122B |
| 10 | VTEP 124 | A | 124A |
| 10 | VTEP 124 | B | 124B |

In another example, monitor 140 maintains a database of all of the flows in the network 130, which may be sent (e.g., as flow information 510, 512, and 514) to the controller 150. The database of all of the flows may include identifying the flow by the application that generated the traffic, a VXLAN group, a VNID, the source VTEP, the destination VTEP, and/or the state of the path (e.g., active or standby), as shown in Table 3 below. In the example shown in Table 3, the path identifier is included in the VNID by generating a different VNID within the same VXLAN group.

TABLE 3

Flow/path tracking through network 130

| Flow | VXLAN Group | VNID | Local VTEP | Remote VTEP | State |
|------|-------------|------|------------|-------------|-------|
| Application 1 | 1 | 10 | VTEP 120A | VTEP 122A | Active |
| Application 1 | 1 | 20 | VTEP 120B | VTEP 122B | Standby |
| Application 2 | 1 | 10 | VTEP 120A | VTEP 124A | Active |
| Application 2 | 1 | 20 | VTEP 120B | VTEP 124B | Active |

In this example, the controller 150 may generate a path enforcement notification that switches the path of one of the flows by changing the state of the path in that flow. As shown in Table 4 below, the traffic enforcement notification changes the active path for Application 1 from path A to path B. The first line entry, corresponding to path 132A, changes from an active state to a standby state. The second line entry, corresponding to path 132B, changes from a standby state to an active state. As with the example in Table 3, the path identifier is included in the VNID of the flow.

TABLE 4

Changing path of a flow through network 130

| Flow | VXLAN Group | VNID | Local VTEP | Remote VTEP | State |
|------|-------------|------|------------|-------------|-------|
| Application 1 | 1 | 10 | VTEP 120A | VTEP 122A | Standby |
| Application 1 | 1 | 20 | VTEP 120B | VTEP 122B | Active |
| Application 2 | 1 | 10 | VTEP 120A | VTEP 124A | Active |
| Application 2 | 1 | 20 | VTEP 120B | VTEP 124B | Active |

Figure 6:
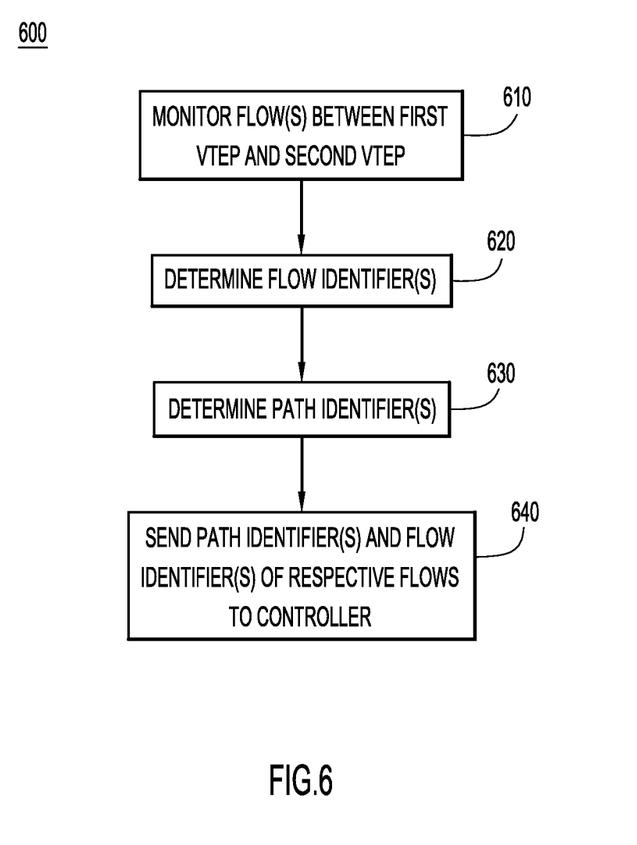
FIG. 6 is a flow diagram illustrating the operations in a network device in monitoring the paths taken by flows through the network device according to an example embodiment.

Referring now to FIG. 6, a flow chart shows the operations of a process 600 performed by a VTEP in tracking the paths that flows take according to an example embodiment. In step 610, the VTEP monitors at least one flow between the VTEP and a remote VTEP. The flows are encapsulated in a virtual network spanning a physical network. The VTEP determines a flow identifier for each flow between the VTEP and the remote VTEP at step 620. The flow identifier is based on information in the header of the packets in the respective flows. In step 630, the VTEP determines a path identifier for each flow that passes through the VTEP to the remote VTEP. The path identifier reflects the path that each respective flow will take along the physical network from the VTEP to the remote VTEP. In step 640, the VTEP sends a message with at least the flow identifier and the path identifier to a controller.

In one example, the controller may also receive traffic information on the various paths in the network in order to make a decision to switch the path that a particular flow will take. The traffic information may include performance and/or usage information on specific network elements.

In another example, the overlay control protocol leaks accessibility information between different VNIDs to generate the information on the various flows in the overlay network of virtual tunnels.

In summary, the techniques presented herein provide for a performance routing mechanism by introducing a path identifier to VXLAN headers. The path identifiers enable path differentiation and enforcement for different traffic flows (e.g., form different applications) in a VXLAN network.

In one form, a method is provided for enabling monitored flows in a virtual network to be re-routed. A first tunnel endpoint of the virtual network monitors at least one flow between the first tunnel endpoint and at least one second tunnel endpoint. The virtual network spans a physical network. A flow identifier of the at least one flow is determined based on packet headers of packets in each respective flow. A path identifier of the at least one flow is also determined based on the packet headers of the packets in each respective flow. Each path identifier indicates a route that the respective flow takes in the physical computer network to reach a respective second tunnel endpoint. The path identifier and the flow identifier of the respective flows are then transmitted to a controller.

In another form, an apparatus is provided for enabling monitored flows in a virtual network to be re-routed. The apparatus includes a network interface unit to communicate with one or more host devices and one or more destination tunnel endpoints of a virtual network spanning a physical network. The network interface unit is also configured to communicate with a controller of the virtual network. The apparatus also includes a processor to monitor at least one flow between the apparatus and at least one of the destination tunnel endpoints of the virtual network. The processor is configured to determine a flow identifier of the at least one flow based on packet headers of packets in each respective flow. The processor is also configured to determine a path identifier of the at least one flow based on the packet headers of the packets in each respective flow. Each path identifier indicates a route that the respective flow takes in the physical computer network to reach a respective destination tunnel endpoint. The processor is further configured to transmit, via the network interface unit, the path identifier and the flow identifier of the respective flow to the controller of the virtual network.

In a further form, one or more non-transitory computer readable storage media are provided for enabling monitored flows in a virtual network to be re-routed. The storage media is encoded with software comprising computer executable instructions and the software is executed operable to cause a processor to monitor at least one flow between a first tunnel endpoint of a virtual network and at least one second tunnel endpoint. The virtual network spans a physical network. The instructions cause the processor to determine a flow identifier of the at least one flow based on packet headers of packets in each respective flow. The instructions also cause the processor to determine a path identifier of the at least one flow based on the packet headers of the packets in each respective flow. Each path identifier indicates a route that the respective flow takes in the physical computer network to reach a respective second tunnel endpoint. The instructions further cause the processor to transmit the path identifier and the flow identifier of the respective flow to a controller.

In still another form, a method is provided for monitoring flows in a virtual network. A tunnel endpoint of a virtual network receives a data packet in a flow. The virtual network spans a physical network. The tunnel endpoint determines a path identifier of the data packet based on a packet header of the data packet. The path identifier indicates a route that the flow takes in the physical network. The tunnel endpoint also determines a flow identifier for the data packet from the packet header of the data packet. The tunnel endpoint transmits the path identifier and the flow identifier to a traffic controller.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a first tunnel endpoint of a virtual network spanning a physical computer network, sending at least one flow to at least one second tunnel endpoint, wherein the first tunnel endpoint and the second tunnel endpoint each include a respective plurality of network interfaces, and wherein a particular network interface of the plurality of network interfaces of the first tunnel endpoint is associated with a corresponding network interface of the plurality of network interfaces of the second tunnel endpoint;
   determining a flow identifier of the at least one flow based on packet headers of packets in each respective flow;
   determining a path identifier of the at least one flow based on the packet headers of the packets in each respective flow, wherein each path identifier indicates a route that the respective flow takes in the physical computer network to reach the corresponding network interface in a respective second tunnel endpoint from the particular network interface in the first tunnel endpoint; and
   transmitting the path identifier and the flow identifier of the respective flow to a controller.

2. The method of claim 1, further comprising:
   receiving from the controller, a path enforcement notification that directs the first tunnel endpoint to move a particular flow to a different route from a different network interface through the physical computer network to a different corresponding network interface of the respective second tunnel endpoint; and
   sending any further packets in the particular flow from the different network interface with packet headers indicating the different route.

3. The method of claim 1, wherein the virtual network is a virtual extensible local area network (VXLAN).

4. The method of claim 3, wherein the path identifier is determined from a VXLAN header of the data packets in each respective flow.

5. The method of claim 4, wherein the path identifier is included in the VXLAN header as a virtual network identifier.

6. The method of claim 4, wherein the path identifier is included in a reserved portion of the VXLAN header.

7. The method of claim 1, wherein the flow identifier includes an indication of an application responsible for the respective flow.

8. An apparatus comprising:
   a plurality of network interfaces, each network interface configured to communicate with one or more host devices and a corresponding network interface of one or more destination tunnel endpoints of a virtual network spanning a physical computer network, the plurality of network interfaces also configured to communicate with a controller of the virtual network; and
   a processor configured to:
      monitor at least one flow between a particular network interface among the plurality of network interfaces of the apparatus and the corresponding network interface of at least one of the destination tunnel endpoints of the virtual network;
      determine a flow identifier of the at least one flow based on packet headers of packets in each respective flow;
      determine a path identifier of the at least one flow based on the packet headers of the packets in each respective flow, wherein each path identifier indicates a route that the respective flow takes in the physical computer network to reach the corresponding network interface in a respective destination tunnel endpoint from the particular network interface in the first tunnel endpoint; and
      transmit, via one of the plurality of network interfaces, the path identifier and the flow identifier of the respective flow to the controller of the virtual network.

9. The apparatus of claim 8, wherein the processor is further configured to:
   receive from the controller a path enforcement notification that directs the processor to move a particular flow to a different route from a different network interface through the physical computer network to a different corresponding network interface of the respective second tunnel endpoint; and
   cause the different network interface to send any further packets in the particular flow with packet headers indicating the different route.

10. The apparatus of claim 8, wherein the virtual network in a virtual extensible local area network (VXLAN).

11. The apparatus of claim 10, wherein the processor determines the path identifier from a VXLAN header of the data packets in each respective flow.

12. The apparatus of claim 11, wherein the path identifier is included in the VXLAN header as a virtual network identifier.

13. The apparatus of claim 11, wherein the path identifier is included in a reserved portion of the VXLAN header.

14. The apparatus of claim 8, wherein the flow identifier includes an indication of an application responsible for the respective flow.

15. One or more non-transitory computer readable storage media encoded with software comprising computer executable instructions and when the software is executed operable to cause a processor to:

monitor at least one flow between a particular network interface among a plurality of network interfaces of a first tunnel endpoint of a virtual network and a corresponding network interface of at least one second tunnel endpoint, the virtual network spanning a physical computer network;

determine a flow identifier of the at least one flow based on packet headers of packets in each respective flow;

determine a path identifier of the at least one flow based on the packet headers of the packets in each respective flow, wherein each path identifier indicates a route that the respective flow takes in the physical computer network to reach the corresponding network interface in a respective second tunnel endpoint from the particular network interface in the first tunnel endpoint; and transmit the path identifier and the flow identifier of the respective flow to a controller.

16. The computer readable media of claim 15, wherein further comprising instructions that cause the processor to:

receive from the controller, a path enforcement notification that directs the first tunnel endpoint to move a particular flow to a different route from a different network interface through the physical computer network to a different corresponding network interface of the respective second tunnel endpoint; and send any further packets in the particular flow from the different network interface with packet headers indicating the different route.

17. The computer readable storage media of claim 15, wherein the virtual network in a virtual extensible local area network (VXLAN).

18. The computer readable storage media of claim 17, wherein the instructions cause the processor to determine the path identifier from a VXLAN header of the data packets in each respective flow.

19. The computer readable storage media of claim 18, wherein the path identifier is included in the VXLAN header as a virtual network identifier.

20. The computer readable storage media of claim 18, wherein the path identifier is included in a reserved portion of the VXLAN header.

* * * * *